Figure 1:
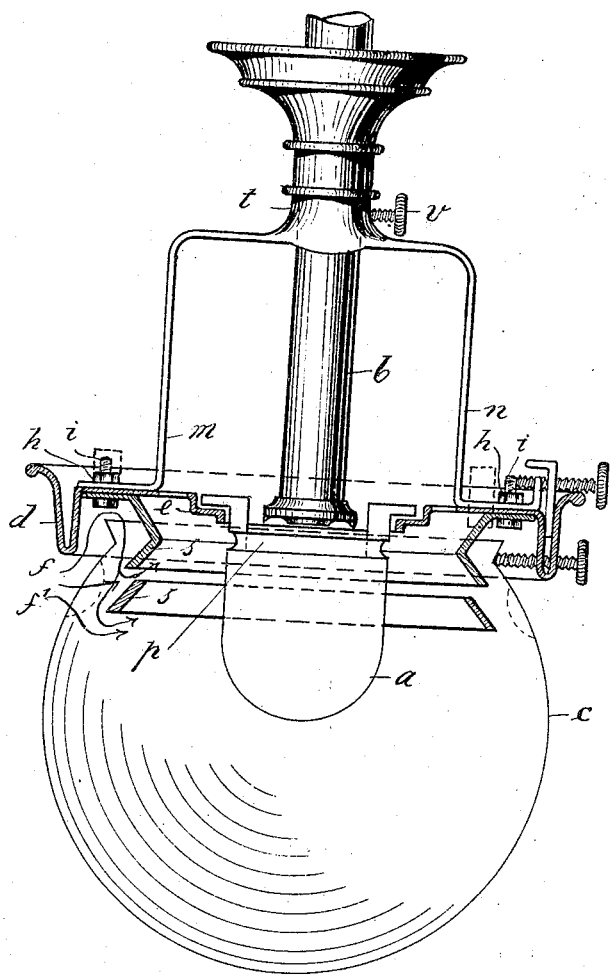

No. 812,961. PATENTED FEB. 20, 1906.
T. STEINICKE.
INVERTED INCANDESCENT GAS LAMP.
APPLICATION FILED NOV. 29, 1904.

Witnesses
Inventor
Therese Steinicke
By Richards
Attorneys

UNITED STATES PATENT OFFICE.

THERESE STEINICKE, OF BERLIN, GERMANY.

INVERTED INCANDESCENT GAS-LAMP.

No. 812,961.　　　Specification of Letters Patent.　　　Patented Feb. 20, 1906.

Application filed November 29, 1904. Serial No. 234,793.

*To all whom it may concern:*

Be it known that I, THERESE STEINICKE, (née KARWINSKY,) a subject of the King of Prussia, and a resident of No. 55 Pariserstrasse, Berlin, in the Kingdom of Prussia, German Empire, have invented certain new and useful Improvements in Inverted Incandescent Gas-Lamps, of which the following is a specification.

My invention relates to improvements in inverted incandescent gas-lamps of that kind in which an incandescent mantle or a plurality of such mantles is surrounded by a globular or otherwise shaped body of glass or other suitable material, open at the top and closed at the bottom, into which body the atmospheric air necessary for the combustion of the mixture of gas and air issuing from the burner-tube into the mantle enters from the open top, while the heated products of combustion rising from and around the incandescent mantle escape from the same open top of the said body. It has been experienced that in lamps of such kind if the globe or body surrounding the mantle be not constructed with considerable width the current of fresh air entering the globular body from the top encounters the current of rising products of combustion, and the two currents, counteracting each other, prevent as well a sufficient supply of fresh air to the outside of the mantle as also a ready escape of the products of combustion. Owing to such difficulties, the lamps of the kind described hitherto failed to give satisfactory results. By applying a globular or otherwise shaped body to surround the mantle with a considerable distance apart—*i. e.*, a body of considerable width with relation to the diameter of the mantle—the difficulties before mentioned may indeed be partly overcome; but lamp-globes of such width are objectionable as well from the point of view of practical use as from that of good appearance. To prevent the two currents before mentioned—*i. e.*, the descending current of fresh atmospheric air and the rising current of products of combustion—from meeting and counteracting each other, it has been tried to separate said currents by a chimney located either to surround the incandescent mantle or arranged above the same. The application of a chimney surrounding the incandescent mantle or placed above the same may in some degree serve to separate the said two currents; but it is objectionable from other points of view.

According to the present invention the current of fresh atmospheric air entering the globular body from the open top will be separated from the current of the rising products of combustion in such a manner that the two currents instead of meeting and counteracting each other will assist and support each other, and the fresh air of combustion instead of being supplied to the incandescent mantle in a direction opposite to that of the mixture of gas and air issuing from the burner-tube will be fed on to the mantle not only from below, but particularly from the sides of the same, and a complete combustion of the mixture of gas and air is obtained all around the mantle.

The means employed according to my invention for obtaining the results before described may further be utilized for reflecting the light of the incandescent mantle in a downward direction, and the construction of the inverted incandescent gas-lamp according to my invention further allows of introducing the mantle into its holding-socket from the upper side of the same, thus facilitating the exchange of the mantle without the necessity of removing the glass of the lamp.

In the accompanying drawings an inverted incandescent gas-lamp constructed according to my invention has been illustrated.

Figure 2:
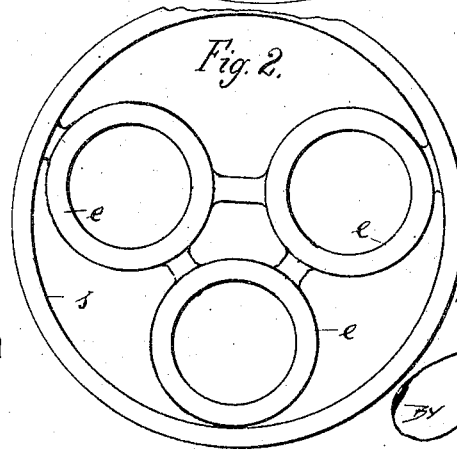

Figure 1 is a vertical section through the lamp constructed for the use of a single incandescent mantle. Fig. 2 is a plan of a socket for holding a plurality—say three—of incandescent mantles at a time.

Referring to Fig. 1, $a$ is the incandescent mantle, and $b$ the burner-tube delivering the mixture of gas and air into the mantle in the usual manner.

$c$ is a body of glass or other suitable material of globular or any other suitable shape, closed at the bottom and open at the top.

The mantle $a$, secured to a ring $p$, of magnesia or the like, as usual, is supported by a socket $e$, which may be made integral with the gallery $d$ or secured to the same by suitable means. The mantle $a$ is surrounded by a shield $s$ or shields, preferably of the shape of a truncated cone and having a central aperture for receiving the mantle $a$, with a sufficient play. The said shield or shields $s$ may be shaped more or less flat, or they may more or less approach the cylindrical form. I prefer to arrange the said shield or shields $s$ around the upper portion of the incandescent mantle $a$ or but slightly above the same, still within the surrounding body $c$. It will be evident that the fresh atmospheric air entering the body $c$ at the top will pass down within the same in the direction of the arrows $f$, while the heated products of combustion rising from and around the incandescent mantle $a$ pass upward within the annular space between the said mantle and the shield or shields $s$, being prevented by the said shield or shields from spreading and escaping to the sides. The current of hot products of combustion rising centrally within the said shields $s$ will draw the fresh air pouring into the body $c$ toward the mantle $a$ in a direction slightly rising toward the central portion or mantle $a$, thus being supplied to the sides of the mantle and all around the same without an accelerated motion of the kind obtained by a chimney surrounding the mantle. The two currents, one rising centrally in a vertical direction and the other rising in an inclined direction toward the central portion, will assist each other in their common rising tendency instead of encountering and counteracting each other. The atmospheric air passing between the two shields $s$ and in contact with the same will undergo a preliminary heating effect before reaching the incandescent mantle, and the heated state of the air will assist the process of combustion and the emission of light of the mantle $a$. The said shields $s$ will equally serve to maintain the burner-flame in a uniform and quiet state by preventing any agitation of the outside atmosphere from reaching the mantle $a$, protected by the said shields $s$. I prefer to make the lower shield $s$ of glass or mica and to provide the lower surface of the upper shield $s$ with a suitable lining or polish to reflect the light of the flame in a downward direction. If a single shield $s$ be employed, it may be constructed or prepared to form a reflector in the manner described. If two or more shields be applied, they are arranged at a suitable distance apart and they are secured to each other or to the gallery $d$ by any suitable means not shown in the drawings.

As has been stated above, the shield or shields $s$ are provided with a central aperture for receiving the mantle $a$ and its socket $e$. For the purpose of introducing the mantle, together with its holding-ring $p$, into the socket $e$ from the upper side of the same, the said socket and the gallery $d$, holding the socket $e$, are so constructed to be removed from the burner-tube $b$. To this effect various means may be employed. The most convenient means consists in securing the tubular part $t$ of the arms $m$ $n$, which carry the gallery $d$, to the burner-tube $b$ by the aid of a binding-screw $u$ or other means capable of being released and readjusted. By loosening the said screw $u$ the arms $m$ $n$, together with the gallery $d$, globe $c$, socket $e$, and mantle $a$, and the surrounding shield or shields $s$, may be drawn down upon the burner-tube $b$ into any convenient lower position, or they may be entirely taken down from the burner-tube $b$. The mantle $a$, with its supporting-ring $p$, then may be readily put into the socket $e$ from the upper side of the same, the tube $b$ being out of the way, or the gallery $d$, being secured to the arms $m$ $n$ by screw-bolts $i$ and nuts $h$, might be adjustably secured to said arms $m$ $n$ by screws or bolts of a greater length, allowing of lowering the gallery $d$, socket $e$, and shields $s$ from the burner tube $b$ in a convenient manner for the purpose of placing the mantle $a$ into the socket $e$ from the upper side of the same.

Instead of employing a single burner-tube $b$ and a single incandescent mantle $a$ in the lamp described a plurality of burner-tubes and mantles $a$ might be arranged in a known manner within a common surrounding body $c$. In Fig. 2 I have illustrated three sockets $e$ for receiving each an incandescent mantle $a$, and the said three sockets $e$ are surrounded by a common shield $s$ of the kind described with reference to Fig. 1. The globe $c$ of the lamp in such case would require an increased width, and three burner-tubes would be required to supply the gas and air to the three separate mantles.

I claim as my invention—

1. In a lamp of the class described, the combination with a burner-tube, a frame supported thereby, a globe carried by the frame, a socket connected to the frame having openings therein, a mantle carried by said socket and an annular shield extending downwardly from the socket into the globe, said shield surrounding the mantle, substantially as described.

2. In a lamp of the class described, the combination with a burner-tube, a frame supported thereby, a globe carried by the frame, a socket connected to the frame having openings therein, a mantle carried by said socket, an annular shield extending downwardly from the socket into the globe, said shield surrounding the mantle, and means for lowering the frame with relation to tube, substantially as described.

In witness whereof I have hereunto set my hand in presence of two witnesses.

THERESE STEINICKE.

Witnesses:
HENRY HASPER,
WOLDEMAR HAUPT.